(12) United States Patent
Holman et al.

(10) Patent No.: US 8,640,835 B2
(45) Date of Patent: Feb. 4, 2014

(54) SUSPENSION UNIT

(75) Inventors: Timothy J. Holman, Nailsea (GB); Brian Stockford, Bristol (GB)

(73) Assignee: Horstman Defence Systems Limited, Bath (GB)

( * ) Notice: Subject to any disclaimer, the term of this patent is extended or adjusted under 35 U.S.C. 154(b) by 475 days.

(21) Appl. No.: 12/440,576

(22) PCT Filed: Sep. 10, 2007

(86) PCT No.: PCT/GB2007/003406
§ 371 (c)(1), (2), (4) Date: Jul. 2, 2009

(87) PCT Pub. No.: WO2008/032031
PCT Pub. Date: Mar. 20, 2008

(65) Prior Publication Data
US 2009/0260902 A1 Oct. 22, 2009

(30) Foreign Application Priority Data
Sep. 13, 2006 (EP) .................................... 06254770

(51) Int. Cl.
F16D 57/00 (2006.01)
F16F 5/00 (2006.01)

(52) U.S. Cl.
USPC ........... 188/266; 188/297; 188/313; 188/314; 188/319.2; 267/64.13; 267/64.26

(58) Field of Classification Search
USPC .......... 188/297, 313–319.2; 267/64.13, 64.26
See application file for complete search history.

(56) References Cited

U.S. PATENT DOCUMENTS

| | | | | |
|---|---|---|---|---|
| 2,563,518 | A * | 8/1951 | Dickerman | 267/64.22 |
| 4,815,716 | A * | 3/1989 | Scotto | 267/64.16 |
| 6,340,153 | B1 * | 1/2002 | Miesner | 267/140.11 |
| 6,814,348 | B1 * | 11/2004 | Leben et al. | 267/217 |
| 2002/0112931 | A1 | 8/2002 | Forster | |
| 2003/0127293 | A1 | 7/2003 | Rosenfeldt et al. | |
| 2004/0188897 | A1 * | 9/2004 | Edmondson et al. | 267/64.13 |
| 2006/0124414 | A1 * | 6/2006 | Hanawa | 188/314 |

FOREIGN PATENT DOCUMENTS

| | | |
|---|---|---|
| DE | 1995279 | 10/1968 |
| EP | 1657470 | 5/2006 |
| ES | 2221533 | 12/2004 |

* cited by examiner

*Primary Examiner* — Robert A Siconolfi
*Assistant Examiner* — Mahbubur Rashid
(74) *Attorney, Agent, or Firm* — Honigman Miller Schwartz and Cohn LLP

(57) ABSTRACT

A suspension unit, for example for a track-laying vehicle, comprises an oil-filled cylinder within which a piston, connected to a piston rod, is provided. The cylinder 4 is oil-filled, and communicates with an upper region of a spring chamber, the lower region 46 of which contains gas under pressure. The piston rod has a hollow interior filled with gas under pressure. The piston is connected by a connecting rod to a secondary piston which is slidable within the piston rod. On rebound the piston rod and the piston move relatively to each other between a retracted end position and an extended end position. During this movement and the return movement, oil is transferred, by way of apertures between damping chambers which serve to damp the relative movement of the piston and the piston rod so avoiding shock loading at the end positions of the movement.

12 Claims, 2 Drawing Sheets

SUSPENSION UNIT

BACKGROUND OF THE INVENTION

This invention relates to a suspension unit, and is particularly, although not exclusively, concerned with a suspension unit for use in connecting a track-supporting wheel of a tracked vehicle to the main vehicle body or structure.

BRIEF DESCRIPTION OF THE INVENTION

EP 1657470 discloses a suspension unit comprising a cylinder in which a piston is slidable, the piston being connected to a piston rod for displacement relative to the piston rod between extended and retracted end positions, and being resiliently biased towards one of the end positions. The pressures prevailing within the unit are such that, in the static condition of the suspension unit in use, the piston and piston rod are in the retracted end position and so move in unison on jounce travel (i.e. when the suspended wheel is moved upwards from the static position). Under rebound, the piston and piston rod move towards the retracted end position. The static position of the suspension unit is established by contact between opposing faces of the piston and the cylinder, and so does not vary as the temperature, and consequently internal pressure, of the gas in the unit changes.

The suspension unit disclosed in EP 1657470 suffers from the disadvantage that, when the piston and piston rod reach the extended and retracted end positions, the components of the unit contact one another with a substantial impact. There is a significant weight penalty in designing the unit to withstand such an impact.

According to the present invention damping means is provided for damping relative movement of the piston and the piston rod towards at least one of the end positions.

In a preferred embodiment, the damping means damps relative movement of the piston and the piston rod towards both of the end positions.

The retracted end position may be defined by contact between the piston and the piston rod. The damping means may comprise at least one chamber which varies in volume as the piston moves relatively to the piston rod between the end positions, and a restrictor which controls the flow rate of fluid into or out of the chamber. In a preferred embodiment, a first chamber is defined within the cylinder between the piston and the piston rod. The piston rod may have a hollow interior, and the piston may be connected by a connecting rod to a secondary piston, disposed within the hollow interior.

The extended end position may be defined by contact between an end wall of the piston rod and the secondary piston. The secondary piston and the end wall may define a second chamber of the damping means. The connecting rod may be hollow, and the restrictor may comprise apertures in the connecting rod which permit fluid flow between the first and second chambers by way of the interior of the connecting rod.

At least one of the apertures may be situated adjacent the piston which is slidable in the cylinder, so that the end wall extends over the aperture in the retracted end position of the piston and the piston rod. Consequently, as the piston and piston rod approach the retracted end position, the flow cross-section of the aperture decreases so as to decelerate the retracting movement. Similarly, at least one of the apertures may be situated adjacent the secondary piston, so that the end wall extends over the aperture in the extended end position.

The piston slidable within the cylinder may be biased relatively to the piston rod towards the extended end position by gas pressure acting on the secondary piston.

The suspension unit may have a spring chamber containing a movable partition, the spring chamber on one side of the partition communicating with the interior of the cylinder on the side of the piston away from the piston rod. The cylinder and the spring chamber between the piston and the partition may be oil filled, and the spring chamber on the other side of the partition may contain gas under pressure to exert a resilient force, through the oil, on the piston.

For a better understanding of the present invention, and to show more clearly how it may be carried into effect, reference will now be made, by way of example, to the accompanying drawings.

DETAILED DESCRIPTION OF THE INVENTION

Figure 1:
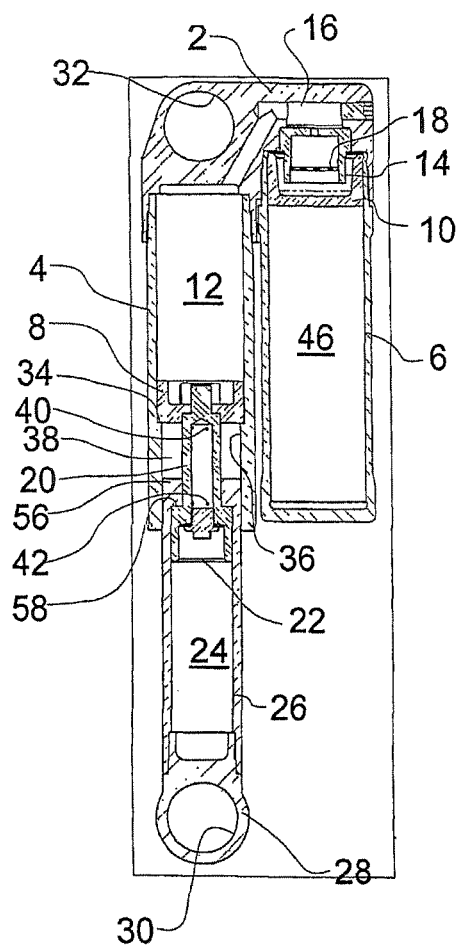
FIG. 1 is a sectional view of a suspension unit in a rebound condition.

As shown in FIG. 1, the unit comprises a support block 2 into which two cylindrical housings 4, 6 are fitted. The left-hand housing 4 as seen in FIG. 1 constitutes a cylinder in which a piston 8 is slidable. The right-hand housing 6 constitutes a gas spring chamber, within which there is a movable partition 10. The region 12 of the cylinder 4 above the piston 8 communicates with the region 14 of the spring chamber above the partition 10 through passageways 16 and a damping element 18.

The piston 8 is secured to a connecting rod 20 having, at its end away from the piston 8, a secondary piston 22. The secondary piston 22 is slidable in the hollow interior 24 of a piston rod 26. The piston rod 26 is closed at its lower end by a support block 28 provided with a journal 30. A similar journal 32 is provided in the upper support block 2. At its upper end, the piston rod 26 has an end wall 56, through which the connecting rod 20 extends.

The downwards movement of the piston 8 (i.e. movement in the direction to increase the volume of the region 12) is limited by a shoulder 34 in the cylinder 4, against which the piston abuts in the condition shown in FIG. 1. Consequently, the interior of the cylinder 4 has a lower region 36 having a smaller diameter than the region 12 above the piston 8. The connecting rod 26 is slidable within this lower region 36. In the condition shown in FIG. 1, the upper end of the connecting rod 26 is spaced from the piston 8 to define within the lower region 36 a first damping chamber 38. The damping chamber 38 communicates with the interior of the connecting rod 20 through apertures 40 situated close to the piston 8. Further apertures 42 are provided in the connecting rod 20, near the secondary piston 22. The apertures 40, 42 serve as a restrictor for the flow of fluid between the first chamber 38 and a second chamber 44 (described below) by way of the interior of the connecting rod 20.

In the condition shown in FIG. 1, the region 12 of the cylinder 4 above the piston 8, the region 14 of the spring chamber in the housing 6 above the partition 10, the passageways 16, the first damping chamber 38 and the interior of the connecting rod 20 are filled with oil or other hydraulic fluid.

The region 46 of the spring chamber below the partition 10 and the interior 24 of the piston rod 26 below the second piston 22 are filled with nitrogen or other suitable gas. Suitable means (not shown) is provided for supplying oil to the passageways 16 and the other oil-filled regions. Oil from the region 12 can pass to the first and second damping chambers 38, 44 through a bleed passage (not shown), the interior of the connecting rod 20 and the apertures 40, 42. There are also fittings (not shown) for supplying nitrogen under pressure to the regions 46 and 24.

For operation, the suspension unit shown in the Figures is mounted to the body or other main structure of a vehicle by means of the journal 32 and to a wheel or other unsprung components by means of the journal 30. In a preferred embodiment, the vehicle is a track-laying vehicle, and the support block 28 is connected to a track guidance wheel over which runs a track of the vehicle. Thus, in practice, the vehicle will have more than one of the suspension units shown in the Figures, each supporting the vehicle structure on a respective track guidance wheel.

Figures 2, 3:
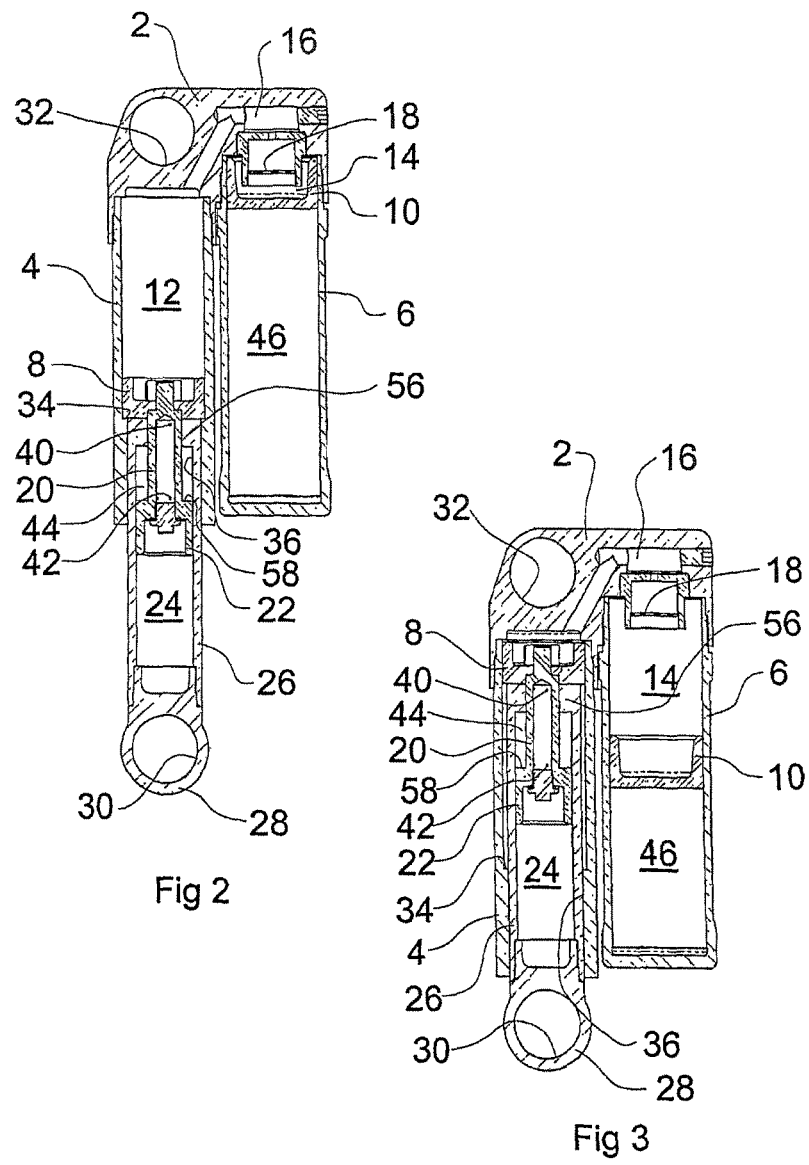
FIG. 2 corresponds to FIG. 1 but shows the unit in a static condition, with some components shown in a simplified form.
FIG. 3 corresponds to FIG. 2, but shows the unit under jounce condition.

In the static condition of the vehicle, the suspension unit will assume the condition shown in FIG. 2. In this condition, the pressure in the lower region 46 of the spring chamber within the housing 6 is sufficient to support the full load on the unit applied by the weight of the vehicle structure. Consequently, the piston 8 is maintained in abutment with the shoulder 34. The shoulder 34 thus establishes the ride height of the vehicle, regardless of the temperature, and therefore pressure, of the gas in the region 46. By contrast, the pressure of the gas in the hollow interior 24 of the connecting rod 26 is not sufficient to support the load imposed by the weight of the vehicle, and so the piston rod 26 is displaced upwardly in the region 36 of the cylinder 4 to abut the underside of the piston 8. The gas in the interior 24 of the piston rod 26 is thus compressed. In this condition, the end wall 56 of the piston rod 26 is moved away from the upper face 58 of the second piston 22, to open up the second damping chamber 44. In the static condition shown in FIG. 2, the piston 8 and the piston rod 26 abut each other to define a retracted end position.

During travel of the vehicle over rough terrain, upward loads are applied to the piston rod 26 by the track guidance wheel supported at the journal 32. These loads force the piston rod 26 upwards, taking with it the piston 8, producing the jounce condition shown in FIG. 3. Oil is displaced from the region 12 of the cylinder 4, through the passageways 16 and the damping element 18, into the upper region 14 of the spring chamber 6. The partition 10 is forced downwardly, so compressing the gas in the region 46 of the spring chamber. When the load on the wheel is reduced, the pressure in the lower region 46 of the spring chamber returns the unit towards the static condition of FIG. 2. The movement of the suspension unit is damped by the damping element 18.

In the condition of rebound, as shown in FIG. 1, where the load on the unit is reduced below the normal static load, the pressure in the interior 24 of the piston rod 26 causes the piston rod 26 to move to an extended end position relative to the piston 8. In this condition, as described above, the end wall 56 abuts the end face 58 of the secondary piston 22 to define an extended end position of the piston 8 and the piston rod 26. The piston 8 is supported on the shoulder 34, so that FIG. 1 shows the maximum extended condition of the unit.

In order to avoid heavy shock loads as the end wall 56 contacts the piston 8 and the end face 58 at the extended and retracted end positions, damping is provided by the first and second damping chambers 38, 44 and the apertures 40 and 42. Thus, as the unit moves from the static condition shown in FIG. 2 towards the rebound condition shown in FIG. 1, oil is displaced from the second chamber 44, through the apertures 42 to the interior of the connecting rod 20. From there, the oil flows through the apertures 40 into the first damping chamber 38. The apertures 42, 40 act as a restrictor, limiting the maximum flow rate of oil, and consequently limiting the maximum travel speed of the end wall 56 along the connecting rod 20. As the end wall 56 approaches the end face 58 of the second piston 22, it moves over the apertures 42, progressively closing them. The reducing flow cross-section of the apertures 42 further restricts the flow of oil, so decelerating the end wall 56 before it strikes the end face 58.

A corresponding damping effect is achieved as the connecting rod 26 and the piston 8 move towards the retracted end position shown in FIG. 2. As the end wall 56 moves upwardly, the reducing volume of the first damping chamber 38 causes oil to be displaced into the connecting rod 20 through the apertures 40, and then through the apertures 42 into the second damping chamber 44. As the end wall 56 approaches the piston 8 it moves over the apertures 40, so decelerating the piston rod 26 as before.

Although the apertures 40, 42 are shown in the Figures as being circular, they could be formed as slots extending lengthwise of the connecting rod 20, or have any suitable alternative shape selected to achieve a desired deceleration profile to ensure smooth operation of the unit.

We claim:

1. A suspension unit comprising:
   a liquid-filled cylinder;
   a piston slidable within the liquid-filled cylinder;
   a piston rod having a gas-filled hollow interior, the piston being connected to the piston rod for displacement relative to the piston rod between extended and retracted end positions, and being resiliently biased towards one of the end positions;
   a moveable secondary piston slidably disposed within the gas-filled hollow interior of the piston rod, the piston being connected to the secondary piston such that the piston and the secondary piston are constrained to move together; and
   damping means for damping displacement of the piston relative to the piston rod towards at least one of the end positions, the damping means comprising a first damping chamber filled with liquid fluid defined within the liquid-filled cylinder between the piston and the piston rod, so as to vary in volume with relative movement between the piston and the piston rod, a second damping chamber filled with liquid fluid defined within the piston rod between the secondary piston and an end wall of the piston rod, and at least one restrictor controlling a flow rate of the liquid fluid between the first and second damping chambers.

2. A suspension unit as claimed in claim 1, wherein the piston is resiliently biased towards the extended end position.

3. A suspension unit as claimed in claim 1, wherein the damping means damps relative movement of the piston and the piston rod towards both end positions.

4. A suspension unit as claimed in claim 1, wherein the retracted end position is defined by contact between the piston and the piston rod.

5. A suspension unit as claimed in claim 1, wherein the extended end position is defined by contact between an end wall of the piston rod and the secondary piston.

6. A suspension unit as claimed in claim 1, wherein the piston is connected to the secondary piston by a connecting rod which has a hollow interior, the restrictor comprising apertures in the connecting rod which permit fluid flow between the first and second damping chambers through the interior of the connecting rod.

7. A suspension unit as claimed in claim 6, wherein the apertures comprise at least one aperture disposed close to the piston, whereby the end wall of the piston rod extends over the aperture in the retracted end position.

8. A suspension unit as claimed in claim 6, wherein the apertures comprise at least one aperture disposed near the secondary piston whereby the end wall of the piston rod extends over the aperture in the extended end position.

9. A suspension unit as claimed in claim 1, wherein the piston is biased relatively to the piston rod towards the extended end position by gas pressure acting on the secondary piston.

10. A suspension unit comprising:
a liquid-filled cylinder;
a piston slidable within the liquid-filled cylinder;
a piston rod having a gas-filled hollow interior, the piston being connected to the piston rod for displacement relative to the piston rod between extended and retracted end positions, and being resiliently biased towards one of the end positions;
a moveable secondary piston disposed within the gas-filled hollow interior of the piston rod, the piston being connected to the secondary piston such that the piston and secondary piston are constrained to move together;
damping means for damping displacement of the piston relative to the piston rod towards at least one of the end positions, the damping means comprising a first damping chamber filled with liquid fluid defined within the liquid-filled cylinder between the piston and the piston rod, so as to vary in volume with relative movement between the piston and the piston rod, a second damping chamber filled with liquid fluid defined within the piston rod between the secondary piston and an end wall of the piston rod, and at least one restrictor controlling a flow rate of the liquid fluid between the first and second damping chambers, wherein the unit includes a spring chamber containing a movable partition, the interior of the spring chamber on one side of the partition communicating with the interior of the liquid-filled cylinder on the side of the piston away from the piston rod, the interior of the liquid-filled cylinder and the interior of the spring chamber on said one side of the partition being oil-filled, and the interior of the spring chamber on the other side of the partition containing gas under pressure.

11. A vehicle having a suspension unit comprising:
a liquid-filled cylinder;
a piston slidable within the liquid-filled cylinder;
a piston rod having a gas-filled hollow interior, the piston being connected to the piston rod for displacement relative to the piston rod between extended and retracted end positions, and being resiliently biased towards one of the end positions;
a secondary piston disposed within the gas-filled hollow interior of the piston rod, the piston being connected to the secondary piston such that the piston and the secondary piston are constrained to move together;
damping means for damping displacement of the piston relative to the piston rod towards at least one of the end positions, the damping means comprising a first damping chamber filled with liquid fluid defined within the liquid-filled cylinder between the piston and the piston rod, so as to vary in volume with relative movement between the piston and the piston rod, a second damping chamber filled with liquid fluid defined within the piston rod between the secondary piston and an end wall of the piston rod, and at least one restrictor controlling a flow rate of the liquid fluid between the first and second damping chambers.

12. A vehicle as claimed in claim 11, wherein the vehicle is a track-laying vehicle, the suspension unit being connected between the vehicle structure and a track guidance wheel.

* * * * *

UNITED STATES PATENT AND TRADEMARK OFFICE
CERTIFICATE OF CORRECTION

PATENT NO.       : 8,640,835 B2                              Page 1 of 1
APPLICATION NO.  : 12/440576
DATED            : February 4, 2014
INVENTOR(S)      : Timothy J. Holman et al.

It is certified that error appears in the above-identified patent and that said Letters Patent is hereby corrected as shown below:

On the Title Page

At item (30) Foreign Application Priority Data, please delete "06254770" and insert --06254770.8--

Signed and Sealed this
Twenty-second Day of April, 2014

Michelle K. Lee
*Deputy Director of the United States Patent and Trademark Office*